United States Patent
McTaggart et al.

(10) Patent No.: US 6,454,082 B1
(45) Date of Patent: Sep. 24, 2002

(54) ROLLER CONVEYOR SYSTEM

(75) Inventors: Michael Douglas McTaggart, Windsor; Andrew Noestheden, Tecumseh, both of (CA)

(73) Assignee: Valiant Corporation, Windsor (CA)

( * ) Notice: Subject to any disclaimer, the term of this patent is extended or adjusted under 35 U.S.C. 154(b) by 69 days.

(21) Appl. No.: 09/730,304

(22) Filed: Dec. 5, 2000

(51) Int. Cl.$^7$ ............................................. B65G 13/06
(52) U.S. Cl. ........................... 198/781.02; 198/781.04
(58) Field of Search ...................... 198/781.02, 781.04

(56) References Cited

U.S. PATENT DOCUMENTS

| | | | | |
|---|---|---|---|---|
| 3,420,356 A | * | 1/1969 | Good | 198/781.02 |
| 4,143,525 A | * | 3/1979 | Major | 64/30 D |
| 4,266,660 A | * | 5/1981 | Herman | 198/781 |
| 4,286,441 A | * | 9/1981 | Scheneman, Jr. et al. | 64/30 C |
| 4,325,474 A | * | 4/1982 | Rae | 198/781 |
| 4,448,302 A | * | 5/1984 | Weaver et al. | 198/781 |
| 4,505,381 A |   | 3/1985 | Major | 198/781 |
| 4,508,212 A | * | 4/1985 | Bolle et al. | 198/781 |
| 4,706,801 A | * | 11/1987 | Vessey | 198/781 |
| 4,930,618 A | * | 6/1990 | Roh | 198/781 |
| 5,038,922 A | * | 8/1991 | Collins et al. | 198/781 |
| 5,137,142 A |   | 8/1992 | Reeves | 198/780 |
| 5,147,024 A | * | 9/1992 | Yamada | 198/781 |
| 5,810,157 A | * | 9/1998 | Nolan | 198/781.04 |

\* cited by examiner

*Primary Examiner*—Douglas Hess
(74) *Attorney, Agent, or Firm*—Gifford, Krass, Groh, Sprinkle, Anderson & Citkowski, P.C.

(57) ABSTRACT

A roller conveyor system is disclosed having a frame with a pair of spaced apart rails and at least one roller assembly having an elongated shaft. A first bearing assembly is secured to one rail while a second bearing assembly is secured to the other rail so that the bearing assemblies are aligned with each other and each bearing assembly includes an inner and outer race. The elongated roller shaft extends through the inner races of the bearing assemblies so that a flat formed on the shaft is radially aligned with the inner race of one of the bearing assemblies. A threaded fastener is then threadably secured to the bearing inner race and has one end adapted to abut against the shaft flat. With the fastener in abutment with the shaft flat, the other end of the fastener is substantially flush with an outer surface of the bearing race. An annular collar is then positioned over the outer surface of the bearing inner race and this collar has an inner diameter substantially the same as the outer diameter of the bearing inner race to thus hold the fastener in abutment with the shaft flat. At least one roller is then secured to an intermediate point of the shaft.

4 Claims, 2 Drawing Sheets

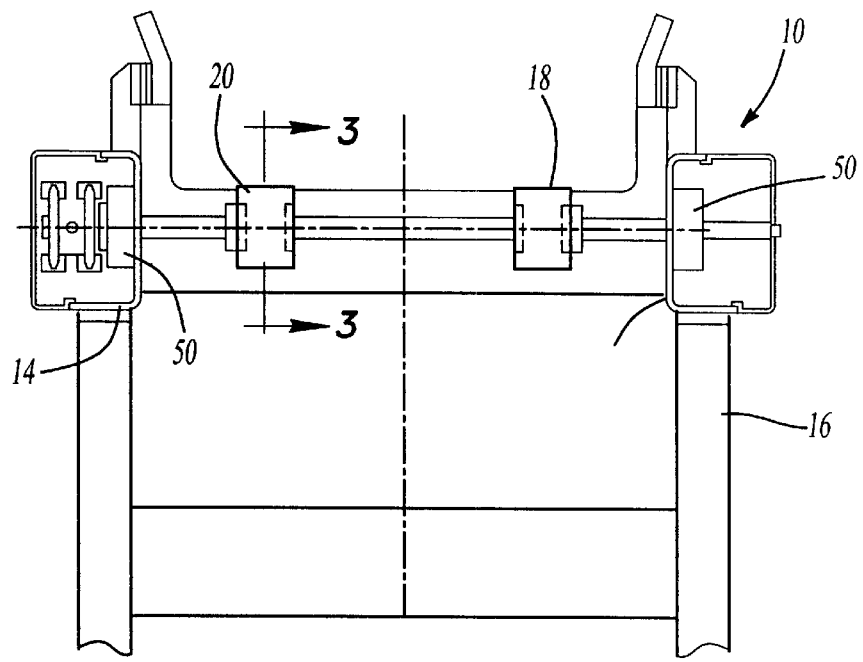
Fig-1
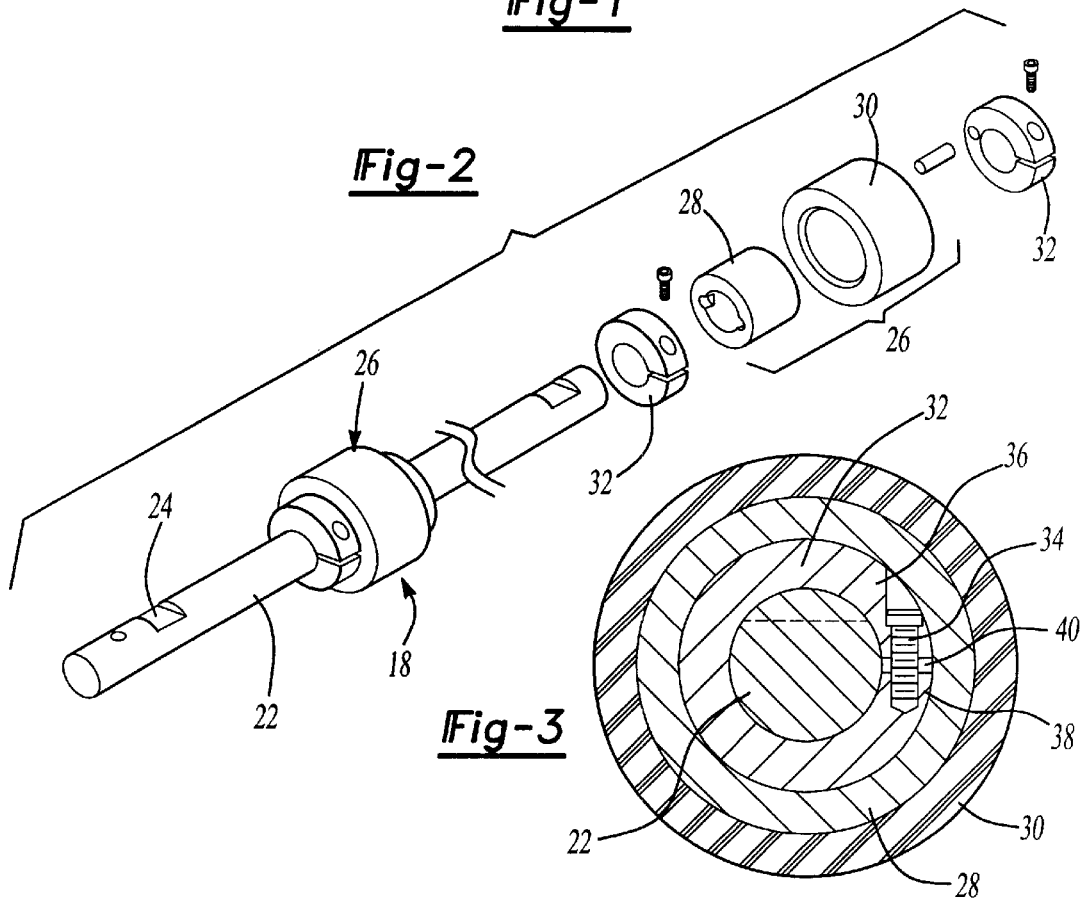
Fig-2
Fig-3

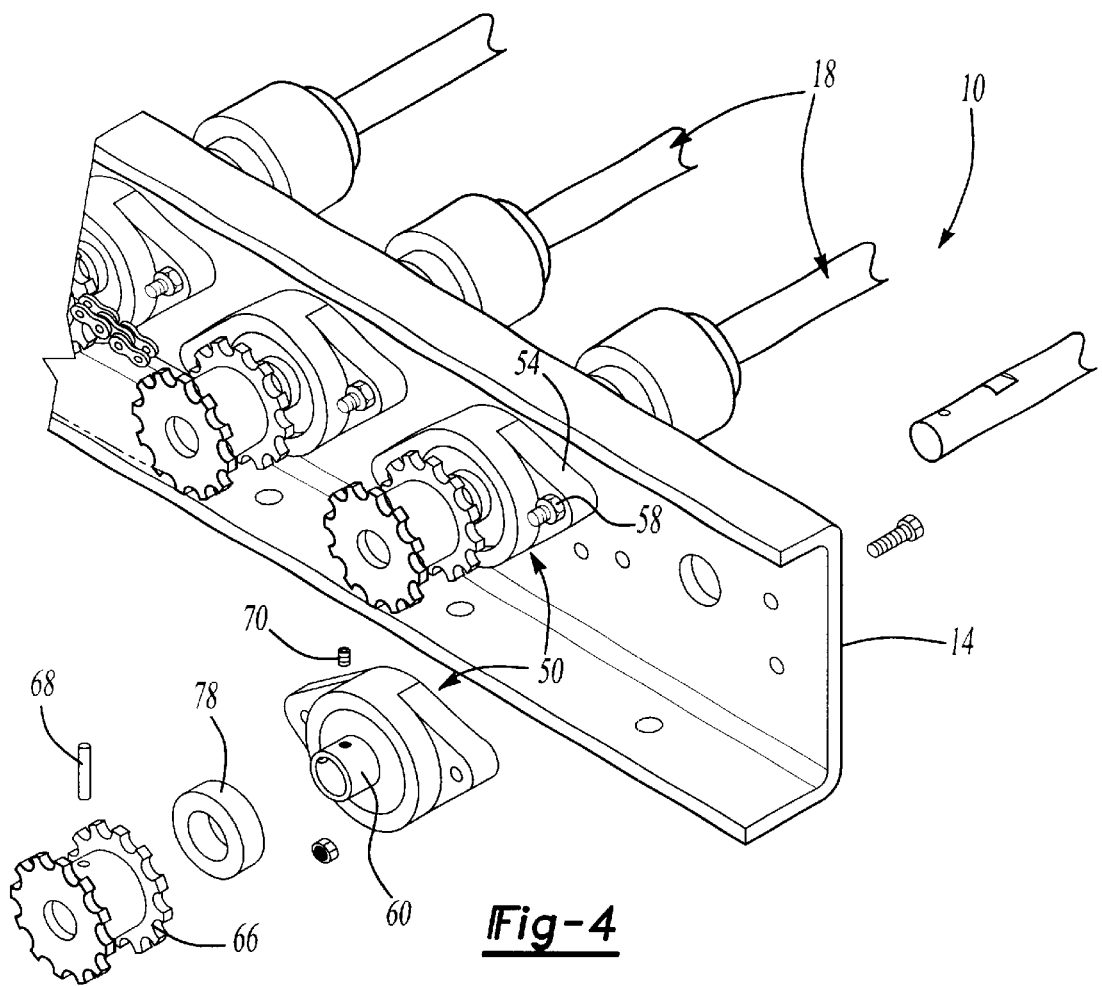
Fig-4
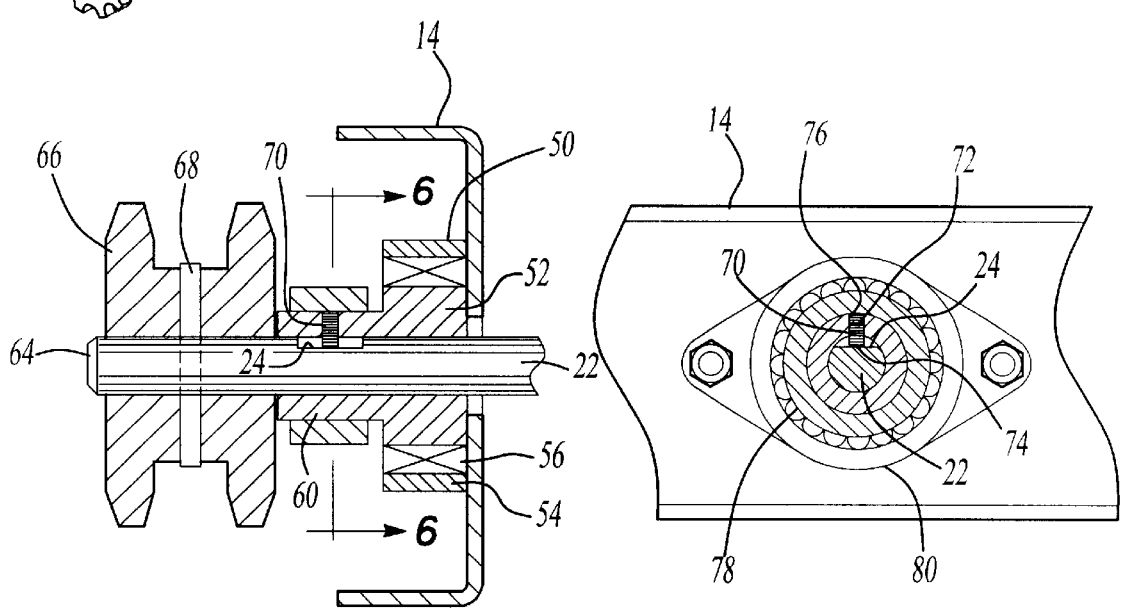
Fig-5
Fig-6

ROLLER CONVEYOR SYSTEM

BACKGROUND OF THE INVENTION

I. Field of the Invention

The present invention relates generally to conveyor systems and, more particularly, to a roller conveyor system.

II. Description of the Prior Art

There are many previously known roller conveyor systems having a frame with a pair of spaced apart rails. A plurality of roller assemblies are then rotatably mounted to the frame so that the roller assemblies extend transversely between the frame rails at spaced apart positions along the frame rails. These roller assemblies, furthermore, support the load or article which is to be conveyed by the roller conveyor system.

In many types of roller conveyor systems, the roller assemblies are powered, i.e. rotatably driven, by rotatably driving the roller assembly shafts. In some cases, the rollers are driven in unison with the shafts while in other cases, such as an accumulating roller conveyor system, the rollers are able to rotate relative to their mounting shafts.

In many of these previously known roller conveyor systems, a pair of bearing assemblies are employed for rotatably mounting the roller shaft to the frame rails with one bearing assembly mounted to each of the frame rails. These bearing assemblies typically include an inner race and an outer race which are rotatably mounted to each other by any conventional fashion, such as ball or needle bearings. The outer bearing race is typically secured to the conveyor frame by bolts or similar fasteners.

In order to minimize the frictional wear and tear between the roller assembly shafts and the bearing assemblies, the inner race of at least one, and typically both, bearing assemblies is secured to the roller shaft so that the roller shaft and inner bearing race rotate in unison with each other.

One previously known method of securing the roller shaft and inner race of the bearing assembly together has been to provide a drive pin extending through a diametric bore formed in both the bearing assembly inner race as well as the roller shaft. This previously known method, however, has several inherent disadvantages.

One disadvantage is that it is relatively expensive to machine the diametric opening through both the bearing inner race as well as the roller shaft. Such increased manufacturing cost necessarily increases the overall cost of the roller conveyor system, particularly since each roller conveyor system employs a large number of roller assemblies.

A still further disadvantage of this previously known method of securing the roller shaft to the bearing inner race has been that it is necessary that the openings in both the bearing inner race as well as the roller shaft precisely align with each other. Otherwise, it is not possible to position a drive bearing between the bearing inner race and the roller shaft. Such precision machining of both the roller shaft as well as the bearing inner race is necessarily expensive.

There have, however, been attempts to secure the bearing inner race to the roller shaft by machining a flat on the roller shaft which registers with the bearing inner race. A threaded fastener is then secured through a radially extending opening in the bearing inner race so that an inner end of the fastener abuts against the shaft flat upon tightening of the fastener. This previously known construction, however, has not proven effective in use.

A primarily disadvantage of this method of securing the bearing inner race to the roller shaft is that, after extended usage of the roller conveyor system, the threaded fasteners "back out" of their threaded holes in the bearing inner race. The attachment of the roller shaft to the bearing inner race becomes loose or, in some cases, the connection between the bearing inner race and the shaft is altogether lost. In either event, the frictional contact between the roller shaft and the bearing assemblies increases which can result in galling of the bearing assemblies and/or roller shafts and failure of the conveyor system.

A still further disadvantage of the previously known roller conveyor systems is that the rollers which support the article conveyed are fixedly secured to the roller conveyor shaft. Since different types of loads or articles require different placement of the rollers, it has been previously necessary to custom manufacture the roller assembly for each different roller conveyor system. This, in turn, unduly increases the overall cost of the roller conveyor system.

SUMMARY OF THE PRESENT INVENTION

The present invention provides a roller conveyor system which overcomes all of the above-mentioned disadvantages of the previously known roller conveyor systems.

In brief, the roller conveyor system of the present invention comprises a frame having a pair of spaced apart rails. The roller conveyor system also includes at least one roller assembly, and more typically a plurality of roller assemblies, wherein each roller assembly includes an elongated shaft.

A pair of bearing assemblies are associated with each roller assembly with one bearing assembly being mounted to each rail so that the bearing assemblies in each pair are coaxially aligned with each other. Each bearing assembly, furthermore, includes both an inner and an outer race and in which the outer race is secured against rotation to the conveyor frame.

The elongated shaft of the roller assembly is then positioned through the inner races of the bearing assembly and the roller shaft includes a flat which is aligned with the inner race of at least one of the bearing assemblies.

A threaded fastener is threadably secured to the inner race of the bearing assembly. This fastener has one end adapted to abut against the shaft flat upon tightening of the fastener thereby securing the shaft to the inner bearing race. Furthermore, this fastener is dimensioned so that, with one end of the fastener in abutment with the shaft flat, the other end of the fastener is substantially flush with an outer surface of the bearing inner race.

A collar is then positioned over the outer surface of the bearing inner race. This collar has an inner diameter substantially the same as the outer diameter of the bearing inner race. Thus, with the collar positioned over the outer surface of the bearing inner race, the collar overlies the threaded fastener and prevents "back out" of the threaded fastener thus effectively locking the fastener against axial movement and maintaining the connection between the bearing inner race and the roller shaft.

At least one roller is secured to the roller shaft at a midpoint of the roller shaft so that the roller is positioned in between the frame rails. Preferably, the roller(s) is axially adjustably secured to the roller shaft by a pair of split rings with one split ring being positioned on each end of the roller.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an end view illustrating a preferred embodiment of the present invention;

FIG. 2 is an exploded view illustrating one roller assembly of the present invention;

FIG. 3 is a sectional view taken substantially along line 3—3 in FIG. 1 and enlarged for clarity;

FIG. 4 is a fragmentary exploded view illustrating a portion of the preferred embodiment of the present invention;

FIG. 5 is a longitudinal sectional view of a portion of the preferred embodiment of the present invention; and FIG. 6 is a sectional view taken substantially along line 6—6 in FIG. 5.

DETAILED DESCRIPTION OF A PREFERRED EMBODIMENT OF THE PRESENT INVENTION

With reference first to FIGS. 1 and 4, a preferred embodiment of the roller conveyor system 10 of the present invention is there shown and comprises a frame having a pair of spaced apart and parallel rails 14 and 16. A plurality of roller assemblies 18 extend transversely between the rails 14 and 16 and define a surface 20 (FIG. 1) upon which articles to be conveyed by the roller conveyor system 10 are supported.

With reference now to FIGS. 2 and 3, one roller assembly 18 is there shown in greater detail and includes an elongated shaft 22 having a flat 24 at one end. At least one and typically more rollers 26 are secured to a midpoint of the shaft 22 so that these rollers 26 are positioned in between the frame rails 14 and 16 (FIG. 1).

Still referring to FIGS. 2 and 3, the rollers 26 are illustrated in the drawing as accumulating rollers having an inner core 28 mounted to the shaft 22 and an outer roller 30 positioned coaxially around the core 28. The outer roller 30 can rotate relative to the core 28 and thus relative to the shaft 22.

The rollers 26 are axially adjustably secured to the shaft 22 so that the axial position of the rollers 26 relative to the frame rails 14 and 16 may be adjusted as desired by the user in order to accommodate different types of articles to be conveyed by the roller conveyor system 10. In order to adjustably secure the rollers 26 to the shaft 22, a pair of split rings 32 are associated with each roller 26 with one split ring 32 positioned closely adjacent each end of its associated roller 26.

With reference now particularly to FIG. 3, a threaded fastener 34 is longitudinally slidably positioned through a first portion 36 of the split ring 32 and threadably engages a threaded bore in a second portion 38 of the split ring 32. A gap 40 is provided between the split ring portions 36 and 38 so that, upon tightening of the fastener 34, the fastener 34 draws the portions 36 and 38 of the split ring 32 together thus compressibly attaching the split ring 32 to the shaft 22. The axial position of the roller 26 may be easily adjusted along the shaft 22 by merely loosening the fasteners 34, adjusting the rollers 26 to the desired position, and then retightening the fasteners 34.

With reference now to FIGS. 1 and 4, a pair of bearing assemblies 50 are associated with each roller assembly 18 to rotatably mount the roller assembly 18 to the frame rails 14 and 16. One bearing assembly 50 is attached to each rail 14 and 16 so that the bearing assemblies 50 for each roller assembly 18 are coaxially aligned with each other.

With reference now to FIGS. 4 and 5, the bearing assembly 50 attached to the rail 14 will be described for one of the roller assemblies 18, it being understood that a like description shall also apply to the bearing assembly 50 attached to the frame rail 16. The bearing assembly 50 includes an inner race 52 and an outer race 54 which are rotatably secured together by any conventional bearing means 56. The outer bearing race 54 is then secured to the frame rail 14 by any conventional fashion, such as fasteners 58 (FIG. 4). Furthermore, the inner bearing race 52 includes a sleeve 60 which protrudes laterally outwardly from the rail 14.

The roller assembly shaft 22 is then positioned coaxially through the bearing 50 so that a free end 64 extends outwardly past the inner bearing race sleeve 60. A drive sprocket 66 is then secured to the free end 64 of the shaft 22 by any conventional means, such as a roll pin 68.

With reference now particularly to FIGS. 5 and 6, in order to secure the shaft 22 to the bearing inner race 52 against rotation, an internally threaded radial bore 70 is provided through the inner bearing sleeve 60 so that this bore 70 registers with the flat 24 formed on the roller shaft 22. A threaded fastener 72 is then threadably positioned in the bore 70 so that one end 74 of the fastener abuts against the shaft flat 24 thus locking the bearing inner race 52 and shaft 24 for rotation in unison with each other.

The fastener 72, furthermore, is dimensioned so that, with the fastener 72 tightened against the shaft 22, the other end 76 of the fastener 72 is substantially flush with an outer surface 78 of the sleeve 60. A collar 80 having an inner diameter substantially the same as the outer diameter of the bearing sleeve 60 is then positioned over the sleeve 60 and thus over the outer radial end 76 of the fastener 72. The collar 80, as best shown in FIG. 5, is sandwiched in between the bearing assembly 50 and the sprocket 66 so that the collar 80 remains in alignment with and overlies the outer end 76 of the fastener 72. The collar 80 thus prevents the fastener 72 from "backing out" of its threaded bore 70 thereby holding the fastener 72 in abutment with the shaft 22 and thus securing the shaft 22 and bearing inner race 52 together.

From the foregoing, it can be seen that the roller conveyor system of the present invention provides a simple and yet highly effective roller conveyor system. Having described my invention, however, many modifications thereto will become apparent to those skilled in the art to which it pertains without deviation from the spirit of the invention as defined by the scope of the appended claims.

We claim:

1. A roller conveyor system comprising:

a frame having a pair of spaced apart rails, at least one roller assembly, said roller assembly having an elongated shaft, a pair of bearing assemblies, one bearing assembly being mounted to each rail so that said bearing assemblies are aligned with each other, each bearing assembly having an inner race and an outer race, said elongated shaft extending through said inner races of said bearing assemblies, said shaft having a flat which is radially aligned with said inner race, a threaded fastener threadably secured to said inner race, said fastener having one end adapted to abut against said shaft flat, said fastener being dimensioned so that, with said one end of said fastener in abutment with said shaft flat, the other end of said fastener is substantially flush with an outer surface of said bearing inner race, a lock ring positioned over said outer surface of said bearing inner race, said ring having an inner diameter substantially the same as said outer surface of said bearing inner race to thereby hold said fastener in abutment with said shaft flat, a roller, and means for attaching said roller to an intermediate point of said shaft.

2. The invention as defined in claim 1 wherein said roller attaching means comprises means for axially adjustably attaching said roller to said shaft.

3. The invention as defined in claim 2 wherein said adjustable attaching means comprises a pair of split rings axially slidably mounted to said shaft, one split ring being positioned on each axial end of said roller, and means for selectively compressibly securing said split rings to said shaft at an axially adjusted position.

4. The invention as defined in claim 3 wherein said compressible securing means comprises a threaded fastener slidably extending through a first portion of said split ring and threadably engaging a second portion of said split ring so that, upon tightening said fastener, said portions of said split ring are drawn together.

\* \* \* \* \*